(12) United States Patent
Harris, III

(10) Patent No.: US 8,271,635 B2
(45) Date of Patent: Sep. 18, 2012

(54) MULTI-TIER, MULTI-STATE LOOKUP

(75) Inventor: Ralph Burton Harris, III, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 12/486,559

(22) Filed: Jun. 17, 2009

(65) Prior Publication Data

US 2010/0325213 A1 Dec. 23, 2010

(51) Int. Cl.
G06F 15/173 (2006.01)

(52) U.S. Cl. ........................ 709/223; 709/224

(58) Field of Classification Search ............... 709/223, 709/224
See application file for complete search history.

(56) References Cited

U.S. PATENT DOCUMENTS

| | | | |
|---|---|---|---|
| 6,631,419 B1 | 10/2003 | Greene | |
| 7,043,494 B1 | 5/2006 | Joshi et al. | |
| 7,325,059 B2 | 1/2008 | Barach et al. | |
| 7,408,932 B2 | 8/2008 | Kounavis et al. | |
| 7,430,560 B1 | 9/2008 | Mittal | |
| 2005/0141519 A1 | 6/2005 | Rajgopal et al. | |
| 2005/0195832 A1 | 9/2005 | Dharmapurikar et al. | |
| 2005/0226235 A1 | 10/2005 | Kumar et al. | |
| 2006/0221967 A1 | 10/2006 | Narayan et al. | |
| 2006/0248079 A1 | 11/2006 | Braica | |

OTHER PUBLICATIONS

A Packet Classification and Filter Management System http://citeseerx.ist.psu.edu/viewdoc/summary?doi=10.1.1.28.9719 V. Srinivasan, Microsoft Research, (10 pages).

*Primary Examiner* — Adnan Mirza
(74) *Attorney, Agent, or Firm* — Workman Nydegger

(57) ABSTRACT

A correlation data structure that correlates each address of a set of addresses to a corresponding state of multiple possible states. The correlation is maintained by correlating entire groups of addresses to a corresponding group-level state. If all of the addresses in a corresponding group of addresses have the same address-level state, then the group-level state at the root-tier state reflects that. Thus, if an address is accessed that is within that group, no further inquiry is needed. The system concludes the address-level state of the address from the group-level state of the group in which the address resides. If there is a mix in the address-level states amongst the addresses in the corresponding group, then the group level-state at the root-tier correlation may indicate that as well. Thus, further inquiry may be made to identify the address-level state of the address.

17 Claims, 6 Drawing Sheets

MULTI-TIER, MULTI-STATE LOOKUP

BACKGROUND

Electronic Mail (more commonly called "E-mail") enables individuals to communicate text (perhaps even with attachments) across the Internet. This is often advantageous when individuals desire to communicate with each other. Some individuals choose, however, to use the Internet to send unwanted e-mails to other individuals. Often, the unwanted e-mail may be multi-cast to many recipients. Such e-mails are often referred to as "spam".

In many cases, the amount of spam received can often overwhelm a recipient's e-mail account, decreasing the utility of the account. Accordingly, spam filters have been developed that detect suspected spam, and either prevent the suspected spam from being delivered to the recipient, or perform some other action that distinguishes the spam from normal received e-mails.

The detection of spam can occur in multiple stages. Often, a first stage in spam detection is to inspect the source Internet Protocol (IP) address of the e-mail. If the source IP address corresponds to a known spammer, the e-mail originating from that source IP address is categorized as spam. On the other hand, if the source IP address corresponds to a known legitimate non-spammer (also referred to as a "known source"), then the e-mail might be categorized as non-spam. Of course, there are cases in which the identity of the source IP address alone is not sufficient to determine whether or not the e-mail is spam. Thus, further processing may be performed to identify the spam state of the e-mail.

Conventionally, the spam state of the source IP address is obtained by doing a lookup over a network using a Domain Name Server lookup. The source IP address is provided by the e-mail server to the reverse DNS server. The reverse DNS server in turn identifies whether or not that source IP address corresponds to a known spammer, a known non-spammer, or perhaps whether the reverse DNS server simply does not know whether the source IP address is that of a spammer. The result is then passed to the e-mail server, which may then act appropriately depending on whether the e-mail is spam, not-spam, or unknown. This approach is commonly called a DNS Block List (DNSBL).

Specialized implementation of DNS servers optimized for this use are available, such as RBLDNSD. RBLDNSD uses a zone file compressed by expressing it using a notation called Variable-length Subnet Masking (VLSM). The same notation is more commonly called Classless-Inter-Domain Routing (CIDR). An advantage of this notation is that it allows contiguous blocks of addresses to be represented with a single entry.

BRIEF SUMMARY

Embodiments described herein relate to the creation and/or maintenance of a data structure that provides a lookup correlation between each of a set of addresses and a corresponding state of multiple possible states. The lookup correlation is maintained using a root-tier correlation data structure that correlates entire groups of addresses to a corresponding state. If all of the addresses in a corresponding group of addresses have the same address-level state, then the group-level state at the root-tier correlation may be indicative of that. If an address that is accessed is within that group, no further inquiry is needed. In that case, the system may conclude the address-level state of the address corresponds to the group-level state of the group in which the address resides. If there is a mix in the address-level states amongst the addresses in the corresponding group, then the group level-state at the root-tier correlation may indicate that as well. Thus, further inquiry may be made to identify the address-level state of the address.

This correlation data structure may be applied to any type of address, but is most efficient if the address-level state tends to be clustered to be the same. There are a wide variety of address types with this characteristic, and the principles described herein are not limited to any one address type. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Embodiments described herein relate to a correlation data structure that provides a lookup correlation for each address of a set of addresses to a corresponding state of multiple possible states. The correlation is maintained by correlating entire groups of addresses to a corresponding group-level state. If all of the addresses in a corresponding group of addresses have the same address-level state, then the group-level state at the root-tier state reflects that. Thus, if an address that is accessed is within that group, no further inquiry is needed. The system may conclude the address-level state of the address corresponds to the group-level state of the group in which the address resides. If there is a mix in the address-level states amongst the addresses in the corresponding group, then the group level-state at the root-tier correlation may indicate that as well. Thus, further inquiry may be made to identify the address-level state of the address.

First, some introductory discussion regarding a computing system in which the principles described herein may be employed will be described with respect to FIG. 1. Then, various embodiments of the creation and maintenance of the correlation data structure will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
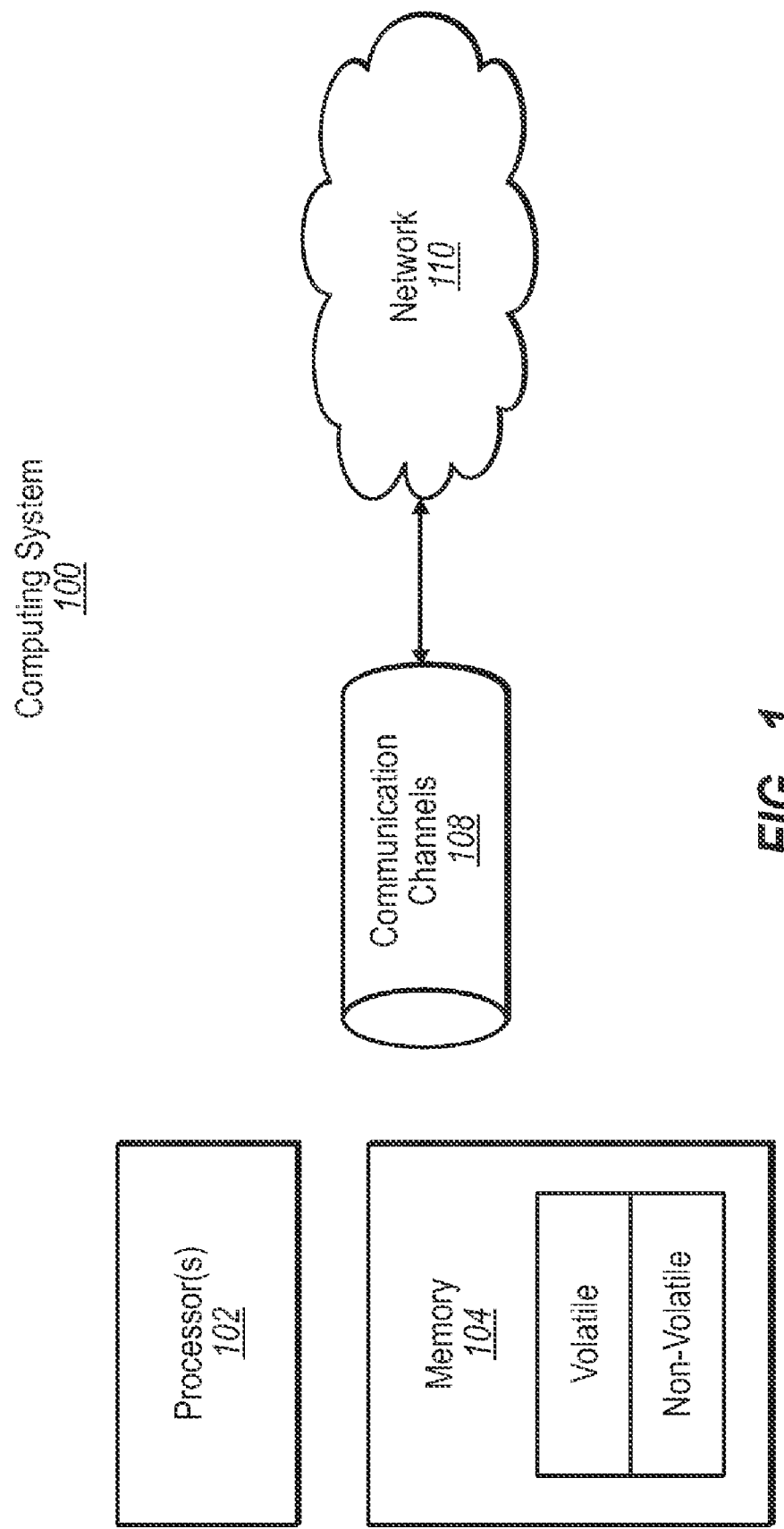
FIG. 1 illustrates a computing system that represents an environment in which the principles described herein may be implemented.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
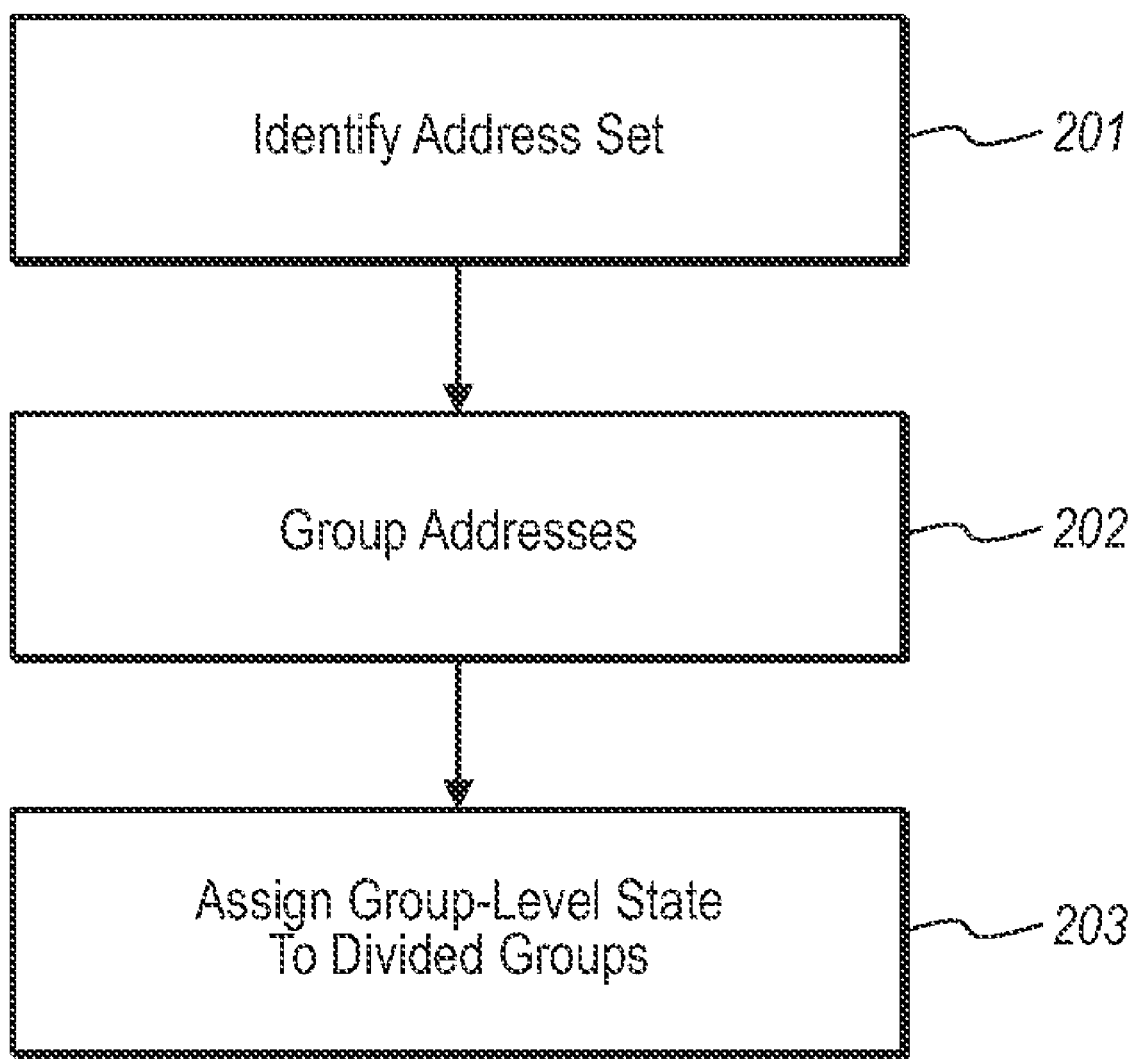
FIG. 2 illustrates a flowchart of a method for setting up an address state look-up mechanism.

FIG. 2 illustrates a flowchart of a method 200 for setting up an address state look-up mechanism. The method and potentially each of the acts may be performed using software in one embodiment. In that case, a physical computer program product may have one or more physical computer-readable media having thereon one or more computer-executable instructions that, when executed by one or more processors (e.g., processor(s) 102 of the computing system), causes the computing system to perform the method. In the claims, one or more computer-executable instructions are often attributed to causing each of the acts. That said, the computer-executable instruction(s) used to perform one act of the method need not be different than the one or more computer-executable instructions used to perform another act of the method. Perhaps even a single set of one or more computer-executable instructions may be used to perform multiple and potentially all of the acts recited in any one claim.

The method 200 may be initiated by identifying a set of addresses (act 201) that each have an associated address-level state that is one of a predetermined set of multiple states. The address set may be any such address set. Furthermore, even given a particular address set, the types of multiple states have no limit either. However, the principles described herein are most effective in making a compact and efficient mechanism for determining an address-level state associated with a particular address if it is common that addresses may be clustered to have the same state, either because the addresses are already naturally laid out in a way that states tend to be clustered together, or because the addresses may be subjected to a transform which tends to cluster addresses having the same address-level state. This principle will be further clarified through the use of several examples provided throughout the remainder of this description.

To illustrate the wide diversity of such address sets that the principles may be applied to, two widely different examples of address sets will be provided herein. In one example, the address set is an Internet Protocol IP set. An IP address might be a 32-bit IP address or perhaps even a 64-bit IP address. In one example more frequently discussed below (referred to as the "IP address example"), the IP address is a 32-bit IP address set, in which there are feasibly 232 different possible IP addresses. The types of state sets that apply to the IP address set may be different depending on what one is trying to accomplish. As an example, if one is trying to determine spam activity associated with a particular source IP address, the multiple states might include, for instance, a "known spammer" state, a "known non-spammer" state, an "unknown" spam state, a "mixed" spam state, and so forth. If there are four or fewer address-level states, then the address-level state may be represented by as few as two bits.

It is typical for large segments of contiguous IP addresses to have the same address-level spam state. For example, if the first 24 bits of a 32-bit IP address were used as a group identifier, the last 8 bits represent a total of 256 possible IP addresses that fit within that group. Often, there might be no spam state at all that is known about any of those 256 IP addresses. Accordingly, they might all have an "unknown" spam state. There might even be cases in which the IP address group might be identified by the first 16 bits of the IP address, leaving a total of $2^{16}$ or 65,536 possible IP addresses in a group. It is also possible that all 65,536 such addresses have the same spam state. For instance, all of the addresses may originate within a certain organization which is trusted, thereby allowing all 65,536 addresses to have a "known non-spammer" spam state. Accordingly, even without the application of a transform, IP addresses may already laid out in a way the groups of contiguous IP addresses already have a common spam state. In some cases, the addresses within a given group will have a mixed address-level state.

However, even if that were not the case, it is possible that the IP address set could be statistically evaluated such that the selection of only certain bits of the IP address are used to define the group in a way that the address resides, such that the groups tend to have clustered states of their constituent addresses. For instance, perhaps bits 1, 3, 4, 6, 7, 8, 13, 14, 15, 17, 18, 23, 31 and 32 are used to identify the group, and the remainder of the bits are used to distinguish one address from another in that group. It may be that such a selection results in a better clustering of addresses having common states.

As another example, the addresses might be a geographical volume defined by a combination of longitudinal ranges, latitudinal ranges, and elevational ranges (hereinafter referred to as the "geographical volume address example"). Here, the states associated within each geographical volume might be any attribute of the addressed volume. As an example, suppose the state describes a wind-shear risk. There might be a five state system in which the address-level states are as follows: 1) invalid, 2) no wind-shear risk, 3) moderate wind-shear risk, 4) severe wind-shear risk, and 5) unknown wind-shear risk.

In this case, there are large contiguous geographical volumes that are within the earth itself (e.g., within a mountain, in or under the ocean, and so forth) or perhaps in outer space, for which the wind-shear state is simply "invalid". The attribute of wind-shear simply does not make sense in those geographical volumes. On the other hand, there are probably also large stretches of contiguous geographical volumes for which there is no historical data on wind-shear. For example, there might areas of the earth and sky for which there has never been any data gathering activity measuring wind-shear. On the other hand, there might be large contiguous areas for which there is wind-shear data, and which tend to have a common wind-shear severity. In this case, once again, large segments of contiguous geographical volumes may have a common address-level state even without a transformation. However, it is also possible that by using some transform to the geographical volume address set that better clustering may be achieved.

Figure 3:
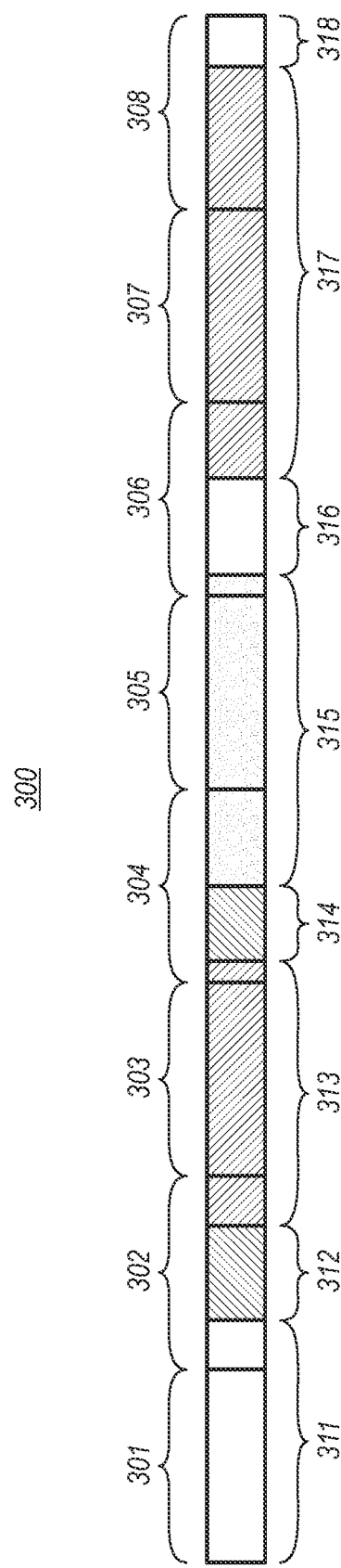
FIG. 3 illustrates an example conceptual address set.

Referring back to FIG. 2, the method 200 includes the act of identifing the address set (act 201). This may already be implicitly accomplished. For instance, in the IP address example, the address set is already implicitly identified by merely knowing that the address set is the 32-bit IP address set. In the case of the geographical volume address example, however, there is much more flexibility in how the volume may be divided in terms of their size and shape. FIG. 3 illustrates a conceptual address set 300. There could be any number of addresses within the set, even millions, billions, trillions, and so forth. Accordingly, the individual addresses are not shown in the conceptual address set 300. In addition, though the address set is shown to vary horizontally (as would be the case for an IP address example), the principles herein also apply to situations in which addresses are multi-dimensional (as in the geographical volume address example).

In any case, once the address set is identified, the addresses are grouped into multiple address sub-groups (act 202). For instance, in FIG. 3, the address set 300 is conceptually grouped into sub-groups 301 through 308, each sub-group containing multiple addresses.

In the IP address example, for instance, the first N number of bits (where N is a whole number) might be a good pick to distinguish one group from another. In one example to be provided hereinafter, suppose the first 16 bits of a 32-bit IP address are used to group sub-groups of $2^{16}$ or 65,536 IP addresses. In the geographical volume address example, perhaps there are regions of the earth that are defined as groups of volumes being defined by certain courser grain longitudinal, latitudinal, and elevational coordinates. For instance, perhaps the volumes are grouped at the highest level only by elevational ranges within 1000 meter elevation ranges, and with no restriction on the longitudinal or latitudinal coordinates. Those groupings that are associated with elevations below minus 1000 meters will only have "invalid" wind-shear state, which is appropriate given that there is no portion of the earth's surface that drops below 1000 meters below sea level. Other elevation range groupings might have volumes that are a mix of wind-shear volumes. For instance, there are some portions of the earth's surface that drop below sea level. Accordingly, for the group between minus 1000 meters and zero meters elevation, while most of the volume addresses will have an invalid address-level wind-shear state (being within the earth or under the ocean), some volume addresses will correspond to volumes that are below sea level, but above the surface of the earth (i.e., below sea-level), thereby being subject to some wind.

Referring to FIG. 3, there are four different address level states represented. The address clusters 311, 316 and 318 each span address ranges for which there is one type of address-level state (e.g., type 1) as represented by their address range box being clear. In this example, which is provided only by way of example, the address cluster 311 having all type #1 address-level state addresses spans the entire sub-group 301 and includes part of sub-group 302. Address cluster 316 includes address that are all of type #1 state and span part of sub-group 306, the sub-group 306 including addresses of other address-level states as well. Address cluster 318 are all of type #1 state and span part of sub-group 308.

The address clusters 312, 314 and 317 each span address ranges for which there is another type of address-level state (e.g., type 2) as symbolized by their address range having forward-diagonal markings. In this example, the address cluster 312 having all type #2 address-level state addresses spans only part of sub-group 302. Likewise, the address cluster 314 having all type #2 address-level state addresses spans only part of sub-group 304. In addition, the address cluster 317 having all type #2 address-level states addresses spans all of sub-group 307 and parts of sub-groups 306 and 308.

In this example, there is only one cluster 313 of type #3 (as symbolized by their address range having backward-diagonal markings) that happens to span sub-group 303 as well as parts of neighboring sub-groups 302 and 304. Likewise, there is only one cluster 315 of type #4 that happens to span sub-group 305 as well as parts of neighboring sub-groups 304 and 306.

In any case, this is just an example used for purposes of discussion only. Clusters of addresses having homogenous state may be as small as one single address in the case where that address is only bordered by other addresses that have different address-level states. On the other extreme, if the entire set of addresses have addresses of the same address-level state, then there would be but a single cluster of addresses having a homogenous state. Of course, in a typical address set, there might be many address clusters of varying sizes. The principles described herein apply to any address set, regardless of its clustering tendencies.

Returning to FIG. 2, once the address set has been sub-divided into sub-groups (act 202), a group-level state is assigned to each sub-group (act 203). Specifically, if all of the addresses in the sub-group have one address-level state (i.e., a "first address-level state"), an appropriate group-level state (i.e., a "first group-level state") is assigned to the corresponding sub-group. On the other hand, if all of the addresses in the sub-group have another address-level state (i.e., a "second address-level state"), an appropriate group-level state (i.e., a "second group-level state") is assigned to the corresponding sub-group, and so forth for sub-groups in which all the addresses have a third address-level state, a fourth address-level state, and so forth.

Thus, referring to FIG. 3, since the sub-group 301 has addresses that all corresponding to a type #1 address-level state, the sub-group 301 would be assigned a type #1 group-level state. Since the sub-group 303 has addresses that all corresponding to a type #3 address-level state, the sub-group 303 would be assigned a type #3 group-level state. Furthermore, since the sub-group 305 has addresses that all corresponding to a type #4 address-level state, the sub-group 303 would be assigned a type #4 group-level state. Finally, since the sub-group 307 has addresses that all corresponding to a type #2 address-level state, the sub-group 307 would be assigned a type #2 group-level state.

On the other hand, if not all of the addresses in the sub-group have the same address-level state, the group is assigned another group-level state (e.g., a "mixed" group-level state). Thus, referring to FIG. 3, the sub-groups 302, 304, 306 and 308 would each be assigned a mixed group-level state.

This will now be applied to the IP address example in which addresses are either "known spammer", "known non-spammer" or "unknown" spam state. Suppose that the first 16 bits of the IP address are used to identify the group, with $2^{16}$ or addresses in each group identified by the last 16 bits of the IP address. For any given group, if all 65,536 addresses are "known spammer" "known non-spammer", or "unknown" spam state, then the corresponding group is assigned a respective "known spammer", known non-spammer" or "unknown" spam state. On the other hand, if the group has a mix of addresses in which there are addresses corresponding to two or more different types of spam state, then the sub-group is assigned a "mixed" spam state.

The principle will now also be applied to the geographic volume address example in which addresses are either "invalid", "no wind-shear risk", "moderate wind-shear risk", "severe wind-shear risk" or "unknown wind-shear risk". If a group of volumes corresponding to the addresses within a sub-group has all of a single wind-shear risk state, then the sub-group might also be assigned that same wind-shear state. However, if the sub-group of volumes has volumes of different wind-shear states, then the sub-group might be assigned a "mixed" wind-shear state.

For any sub-group that has a mixed state, further processing may be performed to identify the address-level state of any desired individual address within that group. One mechanism that may be used to accomplish this is to perform method 200 for each multiple sub-groups. If a higher-tiered sub-group has one or more mixed groups, then the method 200 may be performed for each mixed group at that higher-tier to thereby create a lower-tiered group. In this case, instead of the address set being the whole address set, the address set would simply be those addresses within the sub-group. Furthermore, when dividing the addresses, in act 202, it is the sub-group that is divided into second tier sub-groups (i.e., "sub-sub" groups). Another level of recursion would divide sub-sub-groups into third tier sub-groups (or "sub-sub-sub groups" if you will). The process may continue recursively for any number of sub-group tier levels. At some point, however, the address group would not be divided into further sub-groups, but would merely constitute a direct correlation between individual addresses and their corresponding address-level state. In any case, the end result might be a hierarchy of correlation structures. For the lowest level correlation tables, the addresses themselves would be correlated to a corresponding address-level state. For root or intermediate level correlation tables, the address groups would have corresponding group-level states. An example structure for accomplishing this recursion will be described below with respect to FIG. 7.

Figure 4:
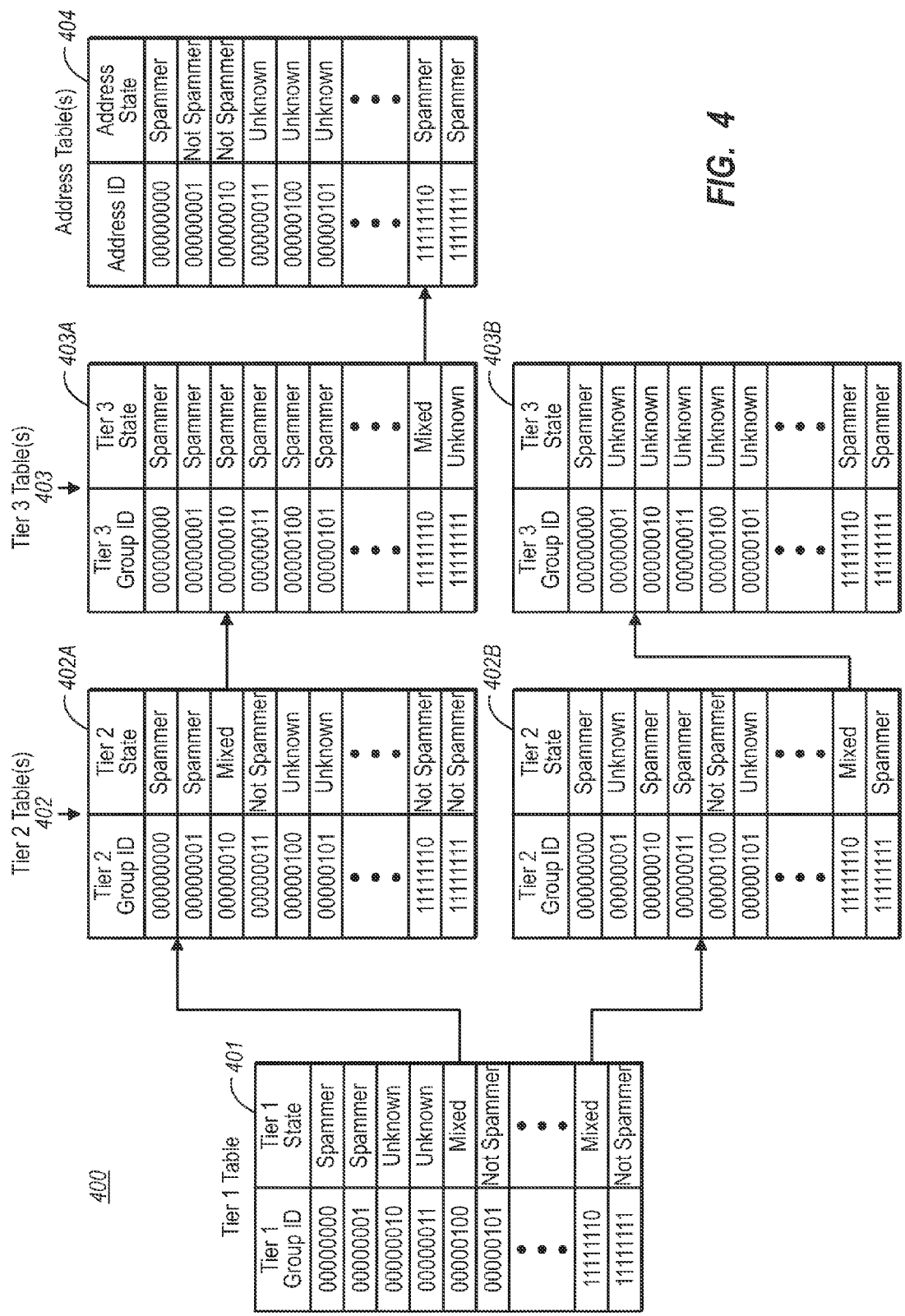
FIG. 4 shows an example correlation hierarchical structure that applies to an example 32-bit IP address.

FIG. 4 shows an example correlation hierarchical structure 400 that applies to an example 32-bit IP address. In this case, the IP address is grouped into 4 groups of 8-bits. The first eight bits are used to define a first-tier sub-grouping of IP addresses. The next eight bits are used to define a second-tier sub-grouping of IP addresses. The next eight bits are used to define a third-tier sub-grouping of IP addresses. The final eight bits are used to the individual addresses themselves.

In this example, there is a single first-tier table 401 that correlates first-tier address groups to a corresponding group-level state. For those first-tier groups for which there is a "mixed" state, there is a corresponding second-tier table 402. For instance, in this case, since there are two addresses illustrated in the first-tier table 401 that have a mixed state, there are two corresponding second-tier tables 402A and 402B. For those second-tier groups for which there is a "mixed" state, there is a corresponding third-tier table 403. In this case, since there are two addresses illustrated in the second-tier tables 402 that have a mixed state, there are two corresponding third-tier tables 403A and 403B. For those third-tier groups for which there is a "mixed" state, there is a corresponding address table 404. In this case, since there is only one address illustrated in the third-tier tables 403 that have a mixed state, there is only one corresponding address table 404. This example is deliberately kept simple. In actual implementation, there might be many thousands or even millions of lower-tier tables since there may be many "mixed" state entries in each table.

As time progresses, the address-level states for a given address might change. If the parent group had previously had all of its addresses of a common address-level state, then the group-level state of the parent group would be changed to a mixed group-level state. If the change in address-level state causes all of the addresses in the parent group to have a common address level state, then the group-level state of the parent group would be changed from a mixed group-level state to a group-level state that reflects that the constituent addresses now all have the same address-level state.

If a group-level state changes for a given group (i.e., a "given constituent group") having a parent group, if the parent group had previously had all of its constituent groups of a common group-level state, then the group-level state of the parent group would be changed to a mixed group-level state.

If the change in the group-level state of the given constituent group causes all of the constituent groups in the parent group to have a common address level state, then the group-level state of the parent group would be changed from a mixed group-level state to a group-level state that reflects that the constituent groups now all have the same group-level state.

For instance, referring to FIG. 4. If the address-level states for all of the addresses in address table 404 were to change to "known spammer" state, then the entry for group 1111110 in table 403A may be changed to "known spammer" state, and the address table 404 data structure may be eliminated. If the group-level state of group 11111111 in table 403A were to also change to "known spammer" state, then the entry for group 00000010 in table 402A may also be changed to "known spammer", and the third-tier table 403A may be eliminated.

If, on the other hand, the group 00000000 of table 401 were to have even one of its $2^{24}$ addresses change from "known spammer" address-level state to some other address level state, then an additional second tier table would be constructed with all of the second-tier group identifiers having a "known spammer" group-level state except for the second-tier group in which the changed address resides. That second-tier group would be assigned a mixed spam state. In addition, that mixed second-tier group would point to an additional third-tier table that lists third-tier groups. All of the third-tier groups would also have a "known spammer" group-level state, except for that third-tier group that contains the address whose address-level state changed. That third-tier group would be assigned a mixed spam state, which would point to an address table in which all of the address correlate to a "known spammer" spam state, except for the address whose address-level state changed. That address would correlate in the new address table to the new address-level state of that address.

Figure 5:
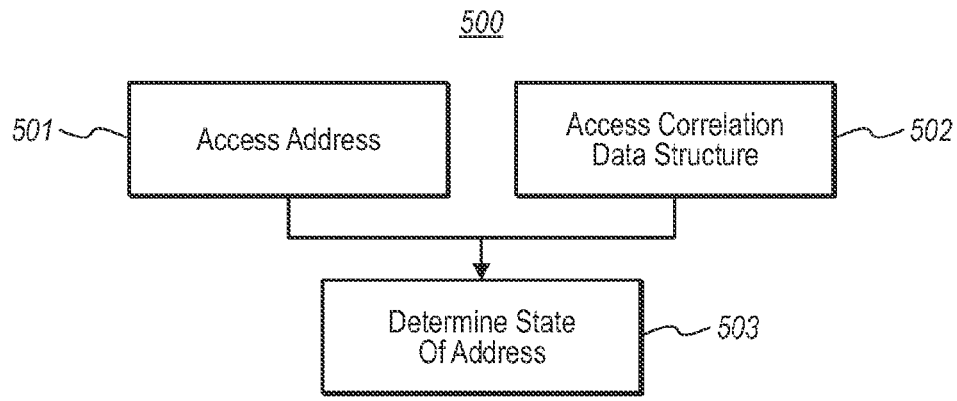
FIG. 5 illustrates a flowchart of a method for accessing an address-level state corresponding to an address.

FIG. 5 illustrates a flowchart of a method 500 for accessing an address-level state corresponding to an address. The method 500 may be performed in hardware, software or a combination thereof If the method 500 is directed by software, the method 500 may be performed by a computing system (such as computing system 100 of FIG. 1) that executes computer-executable instructions using processing unit(s) (such as processing unit(s) 102 of FIG. 1). Such computer-executable instructions may be embodied on one or more physical computer-readable media that are part of a computer program product.

In one embodiment, the method 500 is initiated upon accessing an address (act 501). In the case of the IP address example, the address would be an IP address accessed from, for example, an electronic message such as an e-mail, instant message, or the like. In the case of the geographic volume address example, the address of a specific geographic volume would be accessed. The method 500 is performed by a computing system that has access a correlation data structure that defines a correlation (act 502) between addresses and one of multiple address-level states as previously described. The state of the address is then determined using the correlation data structure (act 503).

Figure 6:
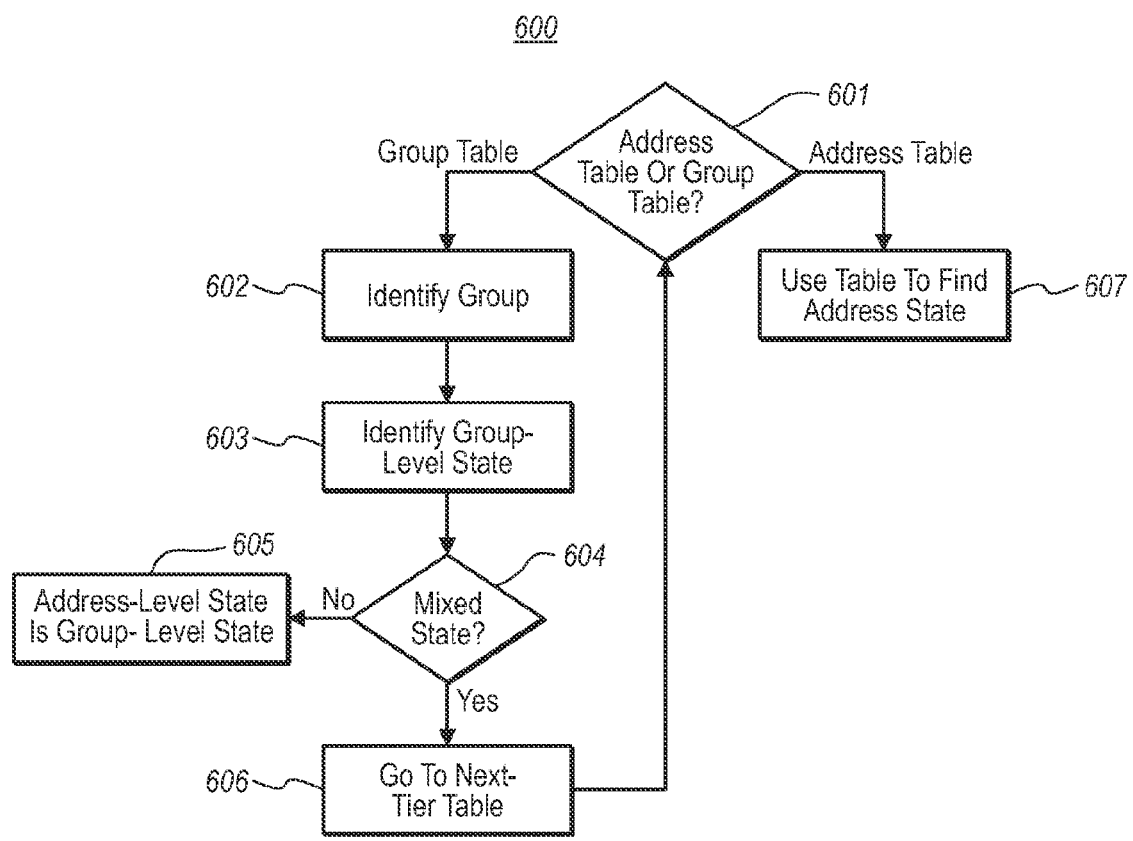
FIG. 6 illustrates a flowchart of a method for determining the state of an address.

Specifically, FIG. 6 illustrates a flowchart of a method 600 for determining the state of an address. The method 600 is performed beginning at the first-tier table and navigates through perhaps other tables as well. The processing may differ depending on whether the current level of recursion is at a group table or an address table (decision block 601). The correlation structure 400 of FIG. 4 will be taken as an example. Suppose the 32-bit IP address being accessed is 00000000,00000000,00000000,00000000 (with comma's placed every 8 binary digits to assist the reader). Thus, at first, the first-tier group table 401 is accessed. Thus, the current table is a "group table" ("Group Table" in decision block 601). In that case, the group is identified (act 602). In this example, the first-tier group is identified using the first 8 bits of the IP address (i.e., 00000000). The corresponding group-level state is then identified using the table (act 603). In this case, using the first-tier table 401, the group-level state corresponding to group 00000000 is "Spammer", which may be identified using a two-bit code (since there are only four possible spammer state: 1) known spammer, 2) known non-spammer, 3) unknown, and 4) mixed. Since the group-level state is not mixed (No in decision block 604), the address-level state of the address is determined to be the state that corresponds to the group-level state of the group (act 605). In this case, the address-level state would be determined to be "known spammer". In this example, the identity of the first-tier group was all that is important, the identity of the $9^{th}$ through $32^{nd}$ bits did not matter.

Suppose now that the accessed IP address were instead 00000100,00000000,00000000,00000000. There, the first-tier group is 00000100, which corresponds to a "mixed" state (Yes in decision block 604). Accordingly, the corresponding second-tier correlation table would be accessed (act 606). In this example, the second-tier correlation table would be table 402A. This is a group table ("Group Table" in decision block 601), with the second-tier group identified with $9^{th}$ through $16^{th}$ bits 00000000. Here, the group-level state is "known spammer" (No in decision block 604), and thus the address-level state of the address would also be determined to be "known spammer" (act 605).

If the address were instead 00000100,00000010,00000000,00000000 the method 600 would use the first-tier table 401 to identify the mixed state of first-tier group 00000100, would use the second-tier table 402A to identify the mixed state of second-tier group 00000010 of the first-tier group 00000100, and would use the third-tier table 403A to identify the "known spammer" state of the third-tier group 00000000 of the second-tier group 00000010 of the first-tier group 00000100.

If the address were instead 00000100,00000010,11111110,00000101, the method 600 would use the first-tier table 401 to identify the mixed state of first-tier group 00000100, would use the second-tier table 402A to identify the mixed state of second-tier group 00000010 of the first-tier group 00000100, and would use the third-tier table 403A to identif the mixed state of the third-tier group 11111110 of the second-tier group 00000010 of the first-tier group 00000100. Here, the method 600 would go to the address table 404 ("Address Table" in decision block 601). The address identifier 00000101 would then be used to identify that address 00000100,00000010,11111110,00000101 has an unknown spam state (act 607).

The lowest level address table is only navigated to if the address has an address-level state that is different than the address-level state for other addresses within that same group. In many case, the first-tier table may be all that is navigated to in order to determine the state of the address. Thus, providing that there is good clustering of address-level states within the address set, the average processing time for determining an address-level state of an address might be reduced.

In addition, the state of each address may be represented quite compactly. For instance, if all of the addresses in a group have the same address-level state, a single identifier may be used to identify the address-level state of all the addresses in that group. Furthermore, if there are only 4 or fewer possible group-level states or address-level states, respectively, the group-level state or address-level state may be represented with perhaps as few as 2 bits. If there are only 8 or fewer possible group-level states or address-level states, respectively, the group-level state or address-level state may be represented with perhaps as few as 3 bits.

Actually, fractional bits may be used to represent a particular group-level state. For instance, five states may be represented using the following methodology using less than 3 bits, but only 2.370 bits per state. The binary address is first divided by 27 (or 1011 after conversion to binary). The quotient is used to retrieve a 64-bit word index in which the state is defined. The 64 bit word is converted into base 5 notation. The remainder "R" tells which base-5 digit is used to determine the state. The following represents this mechanism in pseudo-code.

```
int lookup5state( int address )
{
    int i = address / 27;
    int r = address % 27;
    int64 value = array[address];
    return (int) ((value/(5^r)) % 5)
}
```

Figure 7:
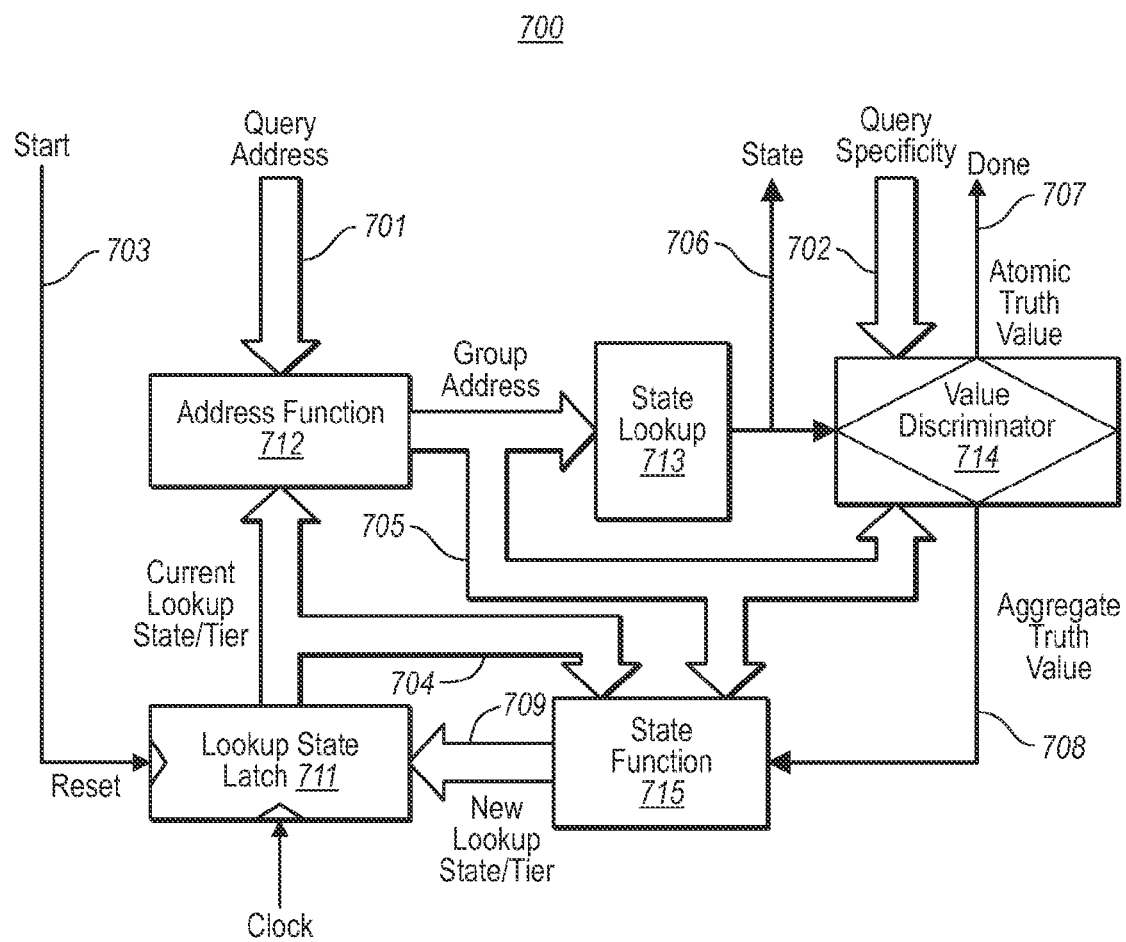
FIG. 7 illustrates a structure that may be used to determine the state of an address.

FIG. 7 illustrates a system 700 that may be used to determine an address-level state corresponding to an address. The inputs to the system 700 include a query address 701, an optional query specificity 702, and a start signal 703. These inputs may either remain stable during operation, or buffered so that the buffered output remains stable. The state latch 711 outputs a current lookup tier signal 704 that represents the current tier in the lookup process. The start signal 703 resets the state latch 711 so that the current lookup tier is the root tier (i.e., tier 0), thus starting the lookup operation.

The query address 701 and the current lookup tier 704 are provided to an address module 712, which determines the group identifier at the current lookup tier (for now, the root tier 0), and then outputs that group address 705. This address module might be a simple set of binary shift and mask operations that isolate portions of the query address (like the IP address case), an arithmetic function involving operations like division and remainder calculations of a power of 10, which might be useful for address in the form of a ZIP code, or some more complicated function as might be needed to coordinate 3-dimentional spherical coordinates in the windshear example.

The resulting group address 705 is initially used to lookup a group-level state using the state lookup module 713. In one embodiment, this may be a directly addressed table/array. The group level state 706 is the primary output of the system, but it may evolve as the system works through several states, as follows.

The group level state, and optionally the query specificity 702 and group address 705 all feed into a value discriminator module 714. The purpose of this is to determine if the group level state is either atomic or specific enough to meet the query specificity input. If the group level state indicates that all of the constituent addresses within that group have the same state, then the group level state is atomic and the value discriminator module 714 outputs a done signal representing completion of the query and thus the group level state 716 would be determined to be the output of the query. Even if the group level state were not atomic (i.e., the group level state was "mixed"), if the query specificity were at the current level, then the value discriminator module 714 would still output the done signal, and the group-level state 716 would be determined to be the output of the query. If, on the other hand, the group level address 706 is not atomic and not specific enough to meet the query specificity 702, then a mixed state indication 708 is sent to a state module 715

The state module 715 receives the mixed state indication 708, the current lookup state 704, and the group address 705 and aggregate truth value feed into associative state module (e.g., a hash table) to calculate a new lookup state. This lookup state might be thought of as capturing both the tier of information being looked up, and some high-order bits of the group address. This new value 709 is captured by the latch 711, and fed into the address module 712 again. Each new clock cycle drives the lookup state toward more specific answers until an atomic (or specific enough) answer is produced. Some implementations may not need all of the inputs shown to the associative lookup function, for example a simple IP lookup hierarchy might simply step through up to 4 states where each masks and processes one byte of the IP address.

The value discriminator module 714 might not need or use a query specificity value 707, if an implementation is designed where only atomic answers are desired. There, the maximum specificity is implied. The value discriminator module 714 might also not need the group address 705, particularly if query specificity is implied.

Thus, a mechanism has been described in which multiple lookup tiers may be navigated to find a state associated with an address. In one embodiment, the result of this lookup may be combined using a rich extension of the traditional two-valued logic operations like AND, OR, NOT, XOR. This approach becomes clearer when the logic values are labeled with less-application specific symbols, which can still be given application-semantics by setting the context. For example in the anti-spam case described above, the anti-spam state may be thought of as being a representation of the answer to the question "is this address (or group of addresses) trusted?". The three possible address-level states being True (T), False (F), or Unknown (ϕ). The four possible group-level states include these three, as well as a Mixed (†). Using these four states, a logical operation may be defined for combining two sources of trusted addresses using a logic operation defined with a 4×4 truth table. The following is an example of an "OR-Trust" (⊙) 4×4 truth table. The OR-Trust logical operation is unconventional, but extends the normal two-value 2×2 OR logical operation.

TABLE 1

| ⊙ | T | F | ∅ | † |
|---|---|---|---|---|
| T | T | T | T | T |
| F | T | F | F | † |
| ∅ | T | ∅ | ∅ | † |
| † | T | † | † | † |

The four entries shown in the first and second rows intersecting with the first and second columns are a simply logical OR operation with the two inputs being True or False.

The entry at the first row and first column represents that both sources indicate that an address is trusted (True), then the address is trusted (True).

The entry at the first row and second column represents that if a first source (hereinafter source #1) indicates that an address is trusted (True), but the other source (hereinafter source #2) indicates that the address is not trusted (False), then the address will still be trusted (True).

The entry at the second row and first column represents that if source #1 indicates that the address is not trusted (False), and the source #2 indicates that it is trusted (True), then the address will be trusted (True).

The entry at the second row and second column represents that if both source #1 and source #2 indicate that the address is not trusted (False), then the address will not be trusted (False).

Continuing into the extended area beyond the traditional 2×2 OR logic truth table, the entry at the first row and third column represents that if source #1 trusts an address (True) and source #2 indicates an unknown trusted state (Unknown) for the address, then the address will still be trusted (True).

The entry at the first row and fourth column represents that if source #1 trusts an address (True) and source #2 indicates a mixed trust state (Mixed) for the address, then the address will still be trusted (True).

Note that in all cases in row #1, the result of the OR-Trust operation is a True trusted state. Also, in all cases in column #1, the result of the OR-Trust operation is a True trusted state. Accordingly, if either source #1 or source #2 trusts an address, the address is considered to be trusted.

The entry at the second row and third column represents that if source #1 does not trust an address (False), and source #2 has an unknown trusted state (Unknown) for that address, the address will be untrusted (False).

The entry at the third row and second column represents that if source #1 has an unknown trusted state (Unknown), and source #2 does not trust the address (False) for that address, the address state remains unknown (Unknown).

The entry at the third row and third column represents that if source #1 has an unknown trusted state (Unknown), and source #2 also has an unknown trusted state (Unknown) for that address, the address state remains unknown (Unknown).

The remaining entries results in a Mixed trusted state. In this case, one or both of the sources have been navigated to a group-level state. Thus, if a Mixed trusted state is not the specificity desired, one or both of the sources may be navigated to the next tier to identify a more specific state for that address. Once the new state is found, the OR-Trust operation may be performed again. For instance, suppose that both source #1 and source #2 were multi-tier lookup architectures previously described. Now suppose a tier-0 lookup resulted in a Mixed state for source #1 and a Mixed state for source #2. Referring to Table 1, this means that the result of the query is Mixed, suggesting more refined lookup is needed for an address-level state. The lookup may proceed to tier-T in source #1 to discover that the address in tier 1 indicates a True trusted state. In that case, referring to Table 1, the address would be trusted (True), and the lookup may end, even though the source #2 lookup did not proceed beyond the Mixed state of Tier 0.

The principles described herein are not limited to a 4×4 operation, but may extend to any "a"×"b" operation, where "a" and "b" may be any plural integer, and need not even be the same integer. For instance, the principles described herein may extend to a 2×5 logical operation where one variable has two possible states, and the other variable has five possible states, and so forth.

Thus, the principles described herein permit an address-level state for address in even large sets of addresses to be efficiency determined using correlation data structures that may be compactly represented. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A physical computer program product comprising one or more physical computer-readable storage devices having stored thereon the following:
   one or more address accessing computer-executable instructions that is or are structured such that, when executed by one or more processors of a computing system, the computing system is caused to access an address;
   one or more state maintaining computer-executable instructions that is or are structured such that, when executed by the one or more processors, the computing system maintains a correlation between a plurality of addresses and multiple address-level states, the multiple address-level states including at least a first address-level state and a second address-level state, wherein the correlation is maintained using a correlation data structure that, at a first tier, correlates each of a plurality of sub-groups of the plurality of addresses to a corresponding one of at least three group-level states including a first group-level state that represents that all of the addresses in the corresponding sub-group of addresses have the first address-level state, a second group-level state that represents that all of the addresses in the corresponding sub-group of addresses have the second address-level state, and a third group-level state that represents that the corresponding sub-group of addresses have a mix of address-level states, and that, at a second tier, correlates each of the addresses for at least one of the sub-groups of addresses to a corresponding one of the at least two address-level states; and
   one or more state determination computer-executable instructions that is or are structured such that, when executed by the one or more processors, the computing system determines a state of an address accessed by the one or more address accessing computer-executable instructions by identifying a group-level state of the sub-group of addresses in which the address belongs, determining that the address-level state of the address is the first address-level state if the identified group-level state is the first group-level state, determining that the address-level state of the address is the second address-level state if the identified group-level state is the second group-level state, and performing further processing if the identified group-level state is the third group-level state, by at least referring to the second tier to identify an address-level state of the address.

2. The computer program product in accordance with claim 1, wherein the address is an electronic address.

3. The computer program product in accordance with claim 2, wherein the first address-level state indicates a first level of trust in electronic messages received from the electronic address, and the second address-level state indicates a second level of trust in electronic message received from the electronic address.

4. The computer program product in accordance with claim 1, wherein the address is a geographical address.

5. The computer program product in accordance with claim 4, wherein the first address-level state indicates a first level of an attribute of a location of the geographical address, and the second address-level state indicates a second level of the attribute of the location of the geographical address.

6. The computer program product in accordance with claim 1, wherein the group-level state is identified using eight bits or fewer each.

7. The computer program product in accordance with claim 1, wherein the group-level state is identified using three bits or fewer each.

8. The computer program product in accordance with claim 1, wherein the state of the address determined by the one or more state determination computer-executable instructions is provided to a multi-state operation module that is capable of evaluating states that have more than two possible values.

9. The computer program product in accordance with claim 1, wherein the group-level state is identified using fractional bits.

10. The computer program product in accordance with claim 1,
wherein an other tier correlates each of a sub-sub group of addresses for at least one of the sub-group of addresses to a corresponding one of the at least three group-level states; and
wherein the performing of further processing if the identified group-level state is the third group-level state comprises referring to the other tier to identify a group-level state of the sub-sub-group of addresses in which the address belongs, determining that the address-level state of the address is the first address-level state if the identified group-level state of the sub-sub-group of addresses is the first group-level state, determining that the address-level state of the address is the second address-level state if the identified group-level state of the sub-sub-group of addresses is the second group-level state, and performing further processing if the identified group-level state of the sub-sub-group is the third group-level state.

11. A physical computer program product comprising one or more physical computer-readable storage devices having stored thereon the following:
one or more address set identification computer-executable instructions that are structured such that, when executed by one or more processors of a computing system, the computing system is caused to identify a set of a plurality of addresses;
one of more address sub-grouping computer executable instructions that are structured such that, when executed by the one or more processors, the computing system groups the plurality of addresses into a plurality of address sub-groups;
one or more group-level state computer-executable instructions that are structured such that, when executed by the one or more processors, the computing system assigns a group-level state to each corresponding address sub-group by 1) assigning a first group level-state to the corresponding address sub-group if all of the addresses in the corresponding address sub-group have a first address-level state, 2) assigning a second group level-state to the corresponding address sub-group if all of the addresses in the corresponding address sub-group have a second address-level state, and 3) assigning a third group level-state to the corresponding address sub-group if not all of the addresses in the corresponding address sub-group have the same address-level state;
one of more address sub-sub-grouping computer executable instructions that are structured such that, when executed by the one or more processors, the computing system sub-groups an address sub-group into a plurality of address sub-sub-groups; and
one or more group-level state computer-executable instructions that are structured such that, when executed by the one or more processors, the computing system assigns a group-level state to each corresponding address sub-sub-group by 1) assigning a first group level-state to the corresponding address sub-sub-group if all of the addresses in the corresponding address sub-sub-group have a first address-level state, 2) assigning a second group level-state to the corresponding address sub-sub-group if all of the addresses in the corresponding address sub-sub-group have a second address-level state, and 3) assigning a third group level-state to the corresponding address sub-sub-group if not all of the addresses in the corresponding address sub-sub-group have the same address-level state.

12. The physical computer program product in accordance with claim 11, wherein the one or more physical computer-readable storage devices further have stored thereon the following:
one of more address sub-sub-sub-grouping computer executable instructions that are structured such that, when executed by the one or more processors, the computing system sub-groups an address sub-sub-group into a plurality of address sub-sub-sub-groups; and
one or more group-level state computer-executable instructions that are structured such that, when executed by the one or more processors, the computing system assigns a group-level state to each corresponding address sub-sub-sub-group by 1) assigning a first group level-state to the corresponding address sub-sub-sub-group if all of the addresses in the corresponding address sub-sub-sub-group have a first address-level state, 2) assigning a second group level-state to the corresponding address sub-sub-sub-group if all of the addresses in the corresponding address sub-sub-sub-group have a second address-level state, and 3) assigning a third group level-state to the corresponding address sub-sub-sub-group if not all of the addresses in the corresponding address sub-sub-sub-group have the same address-level state.

13. The physical computer program product in accordance with claim 11, wherein the one or more physical computer-readable storage devices further have stored thereon the following:
one or more group-level state computer-executable instructions that are structured such that, when executed by the one or more processors, the computing system assigns an address-level state to each address in the corresponding address sub-sub-group.

14. The physical computer program product in accordance with claim 11, wherein the one or more physical computer-readable storage devices further have stored thereon the following:
one or more group-level state computer-executable instructions that are structured such that, when executed by the one or more processors, the computing system assigns an address-level state to each address in the corresponding address sub-group.

15. The physical computer program product in accordance with claim 11, wherein the address is an Internet Protocol (IP) address.

16. The physical computer program product in accordance with claim 11, wherein the address is a geographical address.

17. A computerized method, implemented at a computing system that includes one or more processors and system memory, for identifying spam, the method comprising:

an act of the computing system maintaining a correlation between each of a plurality of first-tier groupings of IP addresses and a first-tier spam determination state, including one or more of spam, not spam, or mixed;

an act of the computing system maintaining a correlation between a plurality of second-tier groupings of IP addresses, the second-tier groupings of IP addresses selected from among first-tier groupings having the mixed first-tier determination state and a second-tier spam determination state including one or more spam or not spam;

an act of the computing system receiving an electronic mail message;

an act of the computing system identifying a source Internet Protocol (IP) address of the electronic mail message;

an act of the computing system identifying a first-tier grouping of IP addresses in which source IP address belongs, and:

if the corresponding spam determination state of the identified first-tier grouping indicates that all IP addresses from the identified first-tier grouping of IP addresses are spam, an act of the computing system categorizing the electronic mail message as spam;

if the corresponding spam determination state of the identified first-tier grouping indicates that all IP addresses from the identified first-tier grouping of IP addresses are not spam, an act of the computing system categorizing the electronic mail message as not spam;

if the corresponding spam determination state of the identified first-tier grouping indicates that the identified first-tier grouping includes IP addresses having the mixed first-tier determination state, an act of the computing system performing further processing to identify an address-level spam determination state of the source IP address, including consulting the second-tier groupings to determine the second-tier spam determination state.

* * * * *